United States Patent
Subramanian et al.

(10) Patent No.: US 7,506,311 B2
(45) Date of Patent: Mar. 17, 2009

(54) TEST TOOL FOR APPLICATION PROGRAMMING INTERFACES

(75) Inventors: Sowmya Subramanian, Mountain View, CA (US); Larry Dean Harris, Belmont, CA (US); Sandeep Khemani, Fremont, CA (US); Thomas W. Nickerson, Independence, CA (US); George A. Buzsaki, Fremont, CA (US); Michael De Groot, Cupertino, CA (US)

(73) Assignee: Oracle International Corporation, Redwood Shores, CA (US)

( * ) Notice: Subject to any disclaimer, the term of this patent is extended or adjusted under 35 U.S.C. 154(b) by 704 days.

(21) Appl. No.: 10/991,883

(22) Filed: Nov. 17, 2004

(65) Prior Publication Data

US 2005/0193266 A1 Sep. 1, 2005

Related U.S. Application Data

(60) Provisional application No. 60/546,451, filed on Feb. 19, 2004.

(51) Int. Cl.
*G06F 9/44* (2006.01)
*G06F 11/00* (2006.01)
*G11C 29/00* (2006.01)
*G01R 31/28* (2006.01)

(52) U.S. Cl. .................. 717/124; 717/106; 717/117; 714/6; 714/25; 714/33; 714/703; 714/715

(58) Field of Classification Search ................. 717/124, 717/127, 130, 100, 106, 114, 110, 112, 117, 717/120, 122; 715/513; 709/328; 714/25, 714/6, 33, 703, 715, 720, 37, 48, 49
See application file for complete search history.

(56) References Cited

U.S. PATENT DOCUMENTS

| | | | | |
|---|---|---|---|---|
| 6,430,556 | B1* | 8/2002 | Goldberg et al. | 707/4 |
| 7,080,092 | B2* | 7/2006 | Upton | 707/102 |
| 2003/0110315 | A1* | 6/2003 | Upton | 709/328 |
| 2004/0128652 | A1* | 7/2004 | Mandava et al. | 717/124 |
| 2004/0210866 | A1* | 10/2004 | Friedman et al. | 717/106 |
| 2005/0071818 | A1* | 3/2005 | Reissman et al. | 717/127 |
| 2005/0172268 | A1* | 8/2005 | Kuturianu et al. | 717/124 |
| 2006/0031757 | A9* | 2/2006 | Vincent, III | 715/513 |
| 2007/0234293 | A1* | 10/2007 | Noller et al. | 717/124 |

* cited by examiner

*Primary Examiner*—Meng-Ai An
*Assistant Examiner*—Abdullah Al Kawsar
(74) *Attorney, Agent, or Firm*—Aka Chan LLP

(57) ABSTRACT

Methods and apparatus for enabling the framework and the application code associated with an application programming interface (API) to be efficiently and comprehensively tested are disclosed. According to one aspect of the present invention, a structure that defines an API test in declarative metadata includes an entity to be tested, a first metadata arrangement, and a second metadata arrangement. The first metadata arrangement includes any data to be used when the entity is tested, and the second metadata arrangement includes any expected outputs associated with testing the entity.

45 Claims, 8 Drawing Sheets

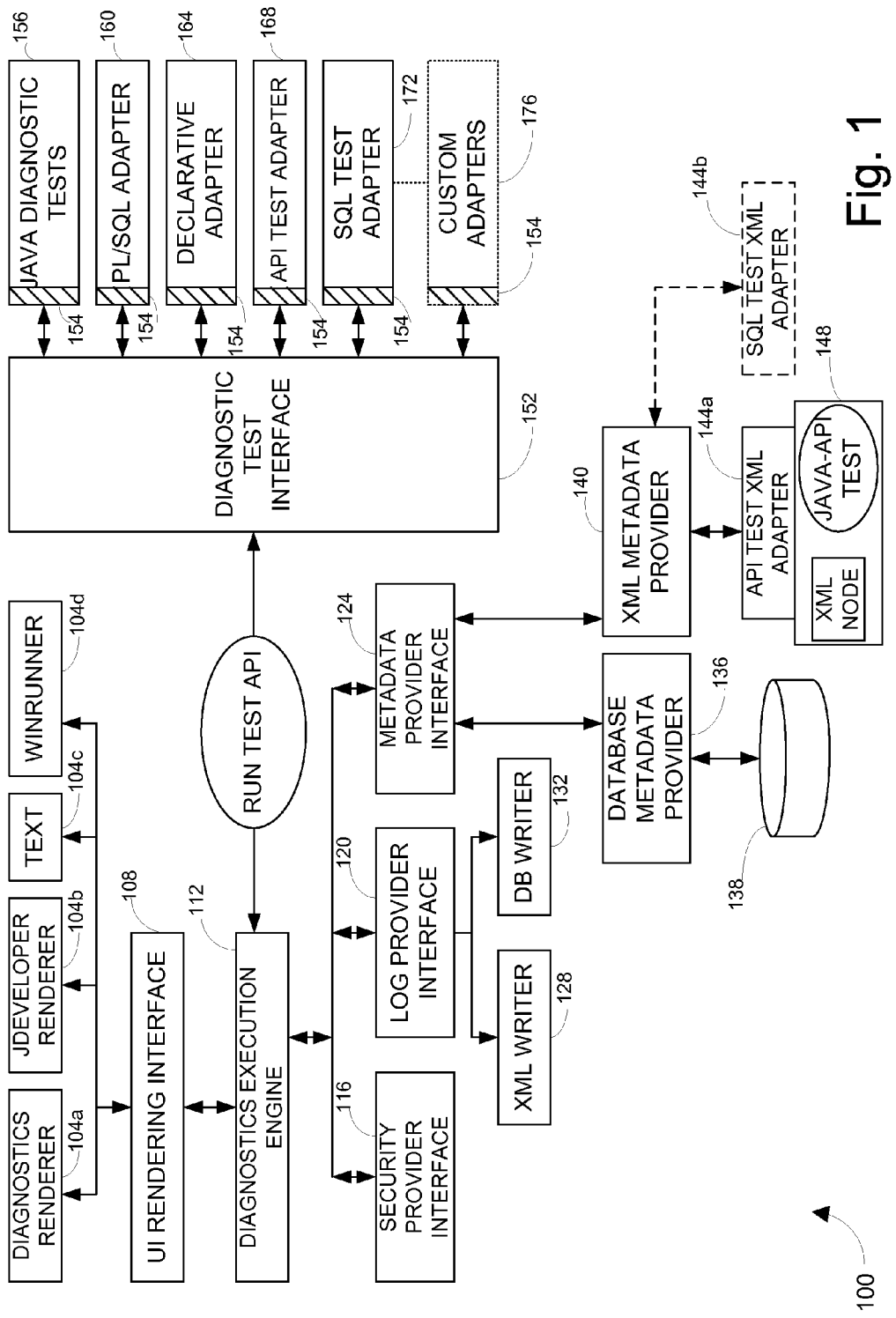

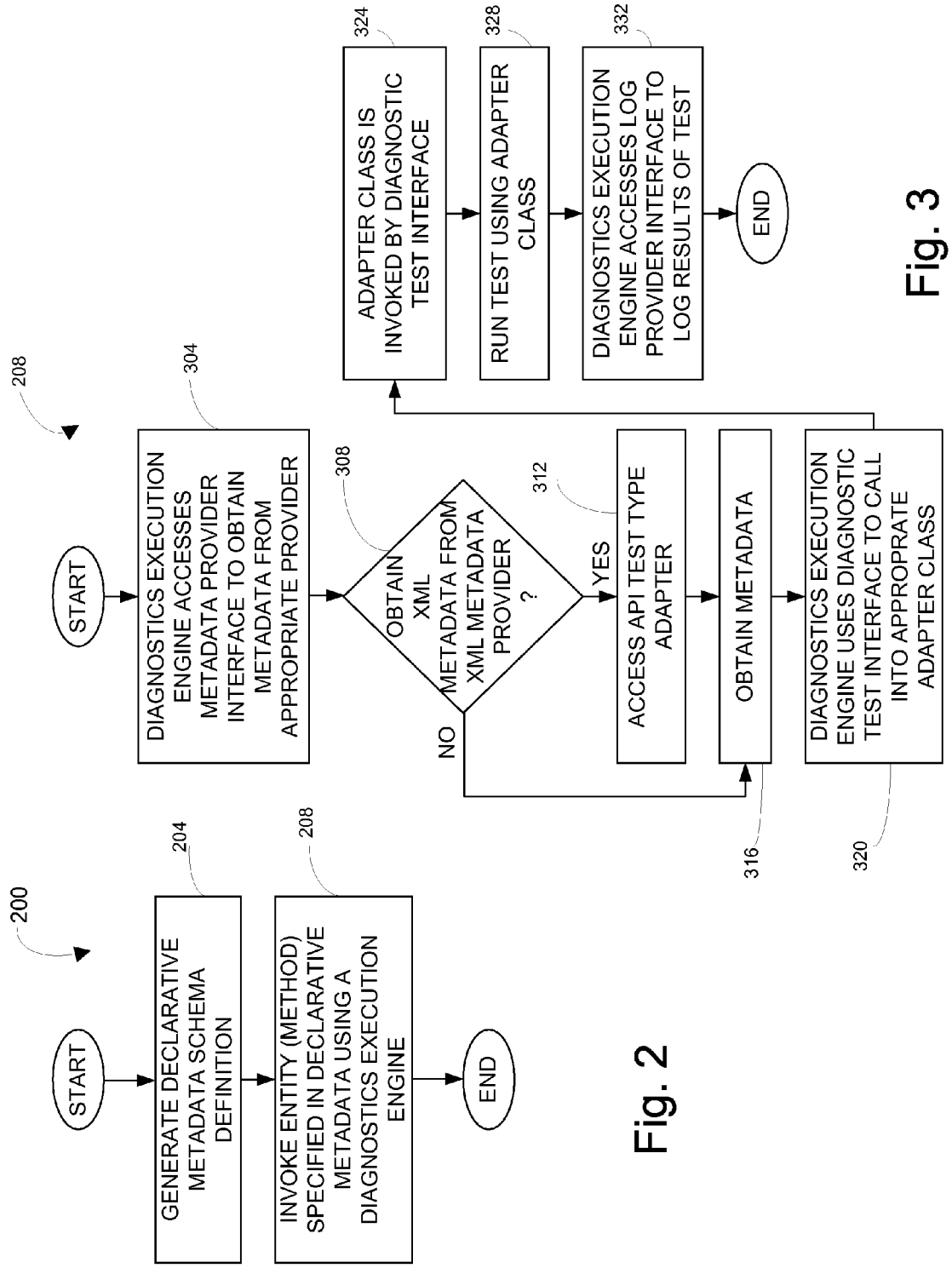

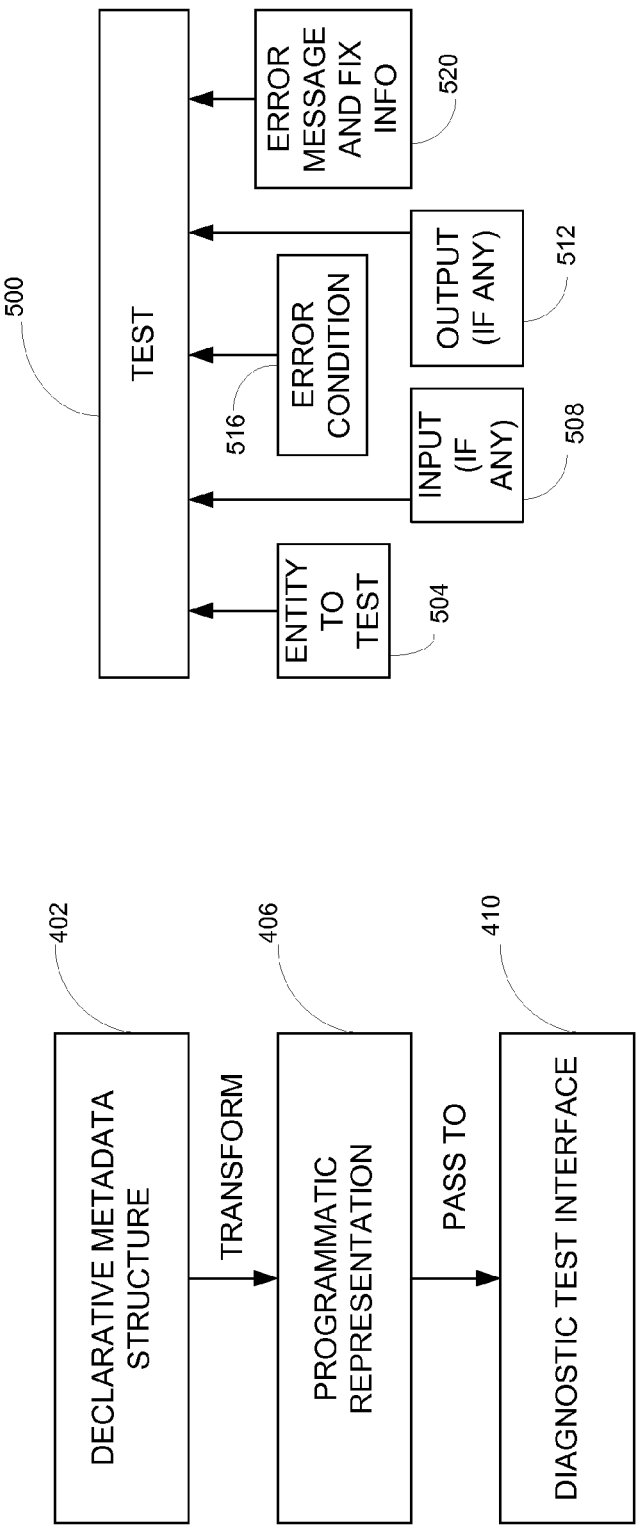

```xml
<APITestType language="JAVA" id="createAccount" methodName="open"
        class="com.usbc.banking.retail.CheckingAccount">

<Description>This API creates new checking account for a new or an
        existing customer for the bank. Internally, this API updates the core
        customer tables with mandatory information required for creating a
        new account </Description>

<ErrorInfo type="NORMAL ERROR">
        <message>Some mandatory customer information was invalid or
            missing.</message>
        <fixInfo>Before calling this API, ensure that mandatory customer
            information is valid. Refer to report for details.</fixInfo>
    </ErrorInfo>

<InputParams>
        <InputParam sequence="1" name="firstName" type="java.lang.String"
            value="John" />
        <InputParam sequence="2" name="lastName" type="java.lang.String"
            value="Doe" />
        <InputParam sequence="3" name="dob" type="java.sql.Date"
            value="1973-21-06" />
        <InputParam sequence="4" name="address" type="java.lang.String"
            value="600 Oracle Parkway. Redwood City, CA 94065" />
        <InputParam sequence="5" name="phone" type="java.lang.String"
            value="650-650-6500" />
        <InputParam sequence="6" name="initialDeposit_USD" type="java.lang.Integer"
            value="10000" />
        <InputParam sequence="7" name="socialSecNumber" type="java.lang.String"
            value="9999-99-9999" />
    </InputParams>

<OutputParams>
        <OutputParam name="accountNumber" type="int"
            target="${data.newAccountNum}" operation="NONE" />
    </OutputParams>

</APITestType>
```

```xml
<TestApp AppShortName="USBC" AppFullName="United States Banking Corp." file-
  version="$Header: USBC_Diagnostics.xml 115.6 2003/11/10 08:30:28 skhemani noship
  $">                                                    — 800
  <TestSuite ComponentIdentifier="Account Functionality" EnvDetail=""  — 802
    SecurityLevel="LOW">
    + <APITestType language="JAVA" id="createAccount" methodName="open"
      class="com.usbc.banking.retail.CheckingAccount">   — 806a
    + <APITestType language....                          — 806b
      .                                                  — 806c
      .
    - <APITestType language="JAVA" id="AccountBalanceAfterDeposit" methodName="getBalance"
      class="com.usbc.banking.retail.CheckingAccount">
        <Description>Given an account number, this API will return the new balance after
          making a deposit into the account.</Description>     — 830
      - <ErrorInfo type="NORMAL ERROR">                        — 834
          <message>Please check the account number.</message>
          <fixInfo>The account number must be valid.</fixInfo>
        </ErrorInfo>
      - <InputParams>                                          — 818
          <InputParam sequence="1" name="account" type="int"   — 814
            source="${data.newAccountNum}" />
        </InputParams>                                         — 826
      - <OutputParams>                                         — 822
          <OutputParam name="balance" type="int" value="20000" operation="" />
        </OutputParams>
      </APITestType>
    + <APITestType language....                          — 806d
      .
      .
  </TestSuite>
</TestApp>
```

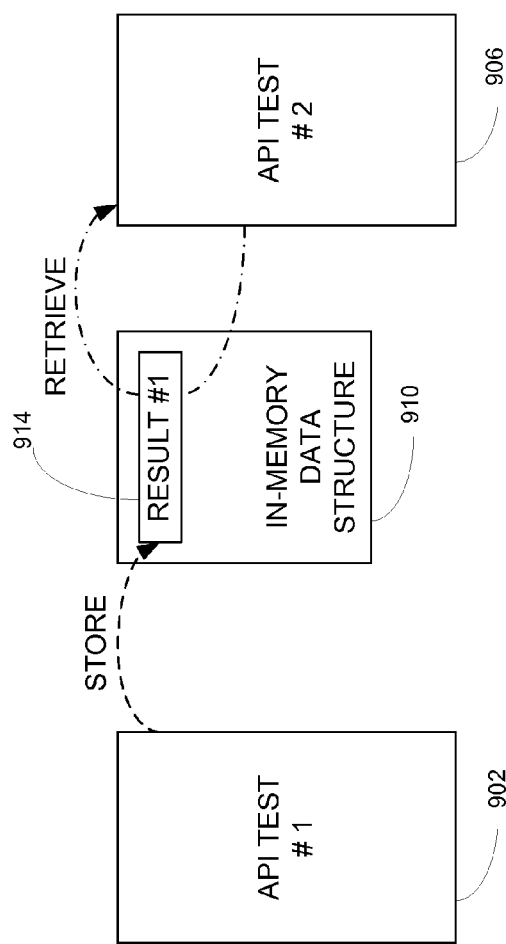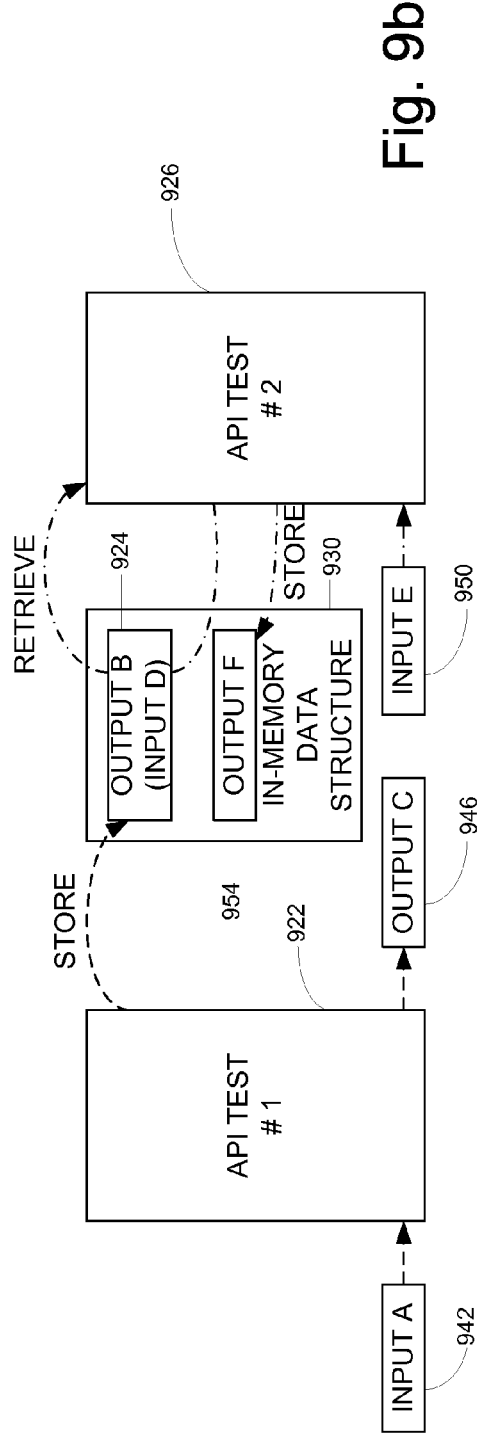

TEST TOOL FOR APPLICATION PROGRAMMING INTERFACES

CROSS REFERENCE TO RELATED PATENT APPLICATION

This patent application claims priority of U.S. Provisional Patent Application No. 60/546,451, entitled "API Test Tool," filed Feb. 19, 2004, which is incorporated herein by reference in its entirety. This patent application is related to co-pending U.S. patent application Ser. No. 10/991,607 and U.S. patent application Ser. No. 10/991,608, filed concurrently herewith, which are incorporated herein by reference in their entireties.

BACKGROUND OF THE INVENTION

1. Field of Invention

The present invention relates to database systems. More specifically, the invention relates to an application programming interface (API) testing system which enables API frameworks and application code to be efficiently tested.

2. Description of the Related Art

An application programming interface (API) is the interface used, or the set of calling conventions used, to allow an application program to access an operating system, as well as other system resources. APIs are often defined at a source code level, and effectively enable a level of abstraction to be present between an application program and a kernel. In some instances, an API may provide an interface between a high level language and lower level services, particularly those services or utilities which may have been written without taking into account calling conventions of compiled languages.

Testing of framework and application code associated with APIs is important to ensure that APIs function as intended. Without thorough testing of the framework and the application code associated with APIs, any errors or other unexpected results which may occur when an API is put into use may not be discovered until the API is used. When an API that is in use fails to function as intended, an application program which uses the API may be prevented from operating as desired.

Typically, for each test case associated with an API, a specific API test is coded and developed. The requirements for valid API tests on a framework and application code may be prohibitive in that a generally high number of tests are typically needed, and many issues may arise relating to the management of the tests. Hence, the requirements for comprehensive API tests on a framework and application code are often considered to be too extensive for comprehensive tests to be productive. As a result, API tests are likely to only be written to test code or test cases which are considered to be particularly important or critical. In other words, not all APIs may be thoroughly tested.

When only some test cases associated with an API are subjected to API testing, the reliability of the API may be compromised, as the framework and application code associated with the API is not fully tested. Since the overhead and the overall costs associated with comprehensively testing the framework and application code associated with the API is generally prohibitive, many developers and users are electing to write API tests for only the most crucial test code or test cases.

Therefore, what is needed is a method and an apparatus which enables the framework and application code associated with an API to be efficiently tested. That is, what is desired is an API test tool which provides a framework which allows API tests to be readily developed.

SUMMARY OF THE INVENTION

The present invention relates to a system for enabling the framework and the application code associated with an application programming interface (API) to be efficiently and comprehensively tested. According to one aspect of the present invention, a structure that defines an API test in declarative metadata includes an entity to be tested, a first metadata arrangement, and a second metadata arrangement. The first metadata arrangement includes any data to be used when the entity is tested, and the second metadata arrangement includes any expected outputs associated with testing the entity. In one embodiment, the declarative metadata structure is represented as XML.

The specification of API tests in declarative metadata allows the API tests to be run within a framework which enables testing to occur without requiring that new, specific API tests be written for each test case. The use of declarative metadata such as XML metadata enables testing of an API framework and API application code to occur using sets of tags which are predefined, i.e., functionality associated with different API tests may be reused. Hence, API tests may be efficiently developed and run, and an API may be comprehensively tested in an efficient manner.

According to another aspect of the present invention, a structure that is arranged to define an API test suite in declarative metadata includes a first entity to be tested and a second entity to be tested. The first entity has associated first metadata arrangement including any inputs associated with testing the first entity and an associated second metadata arrangement including any expected outputs associated with testing the first entity. The second entity has an associated third metadata arrangement including any inputs associated with testing the second entity and an associated fourth metadata arrangement including any expected outputs associated with testing the second entity.

In one embodiment, the output associated with the first entity is stored in an in-memory data structure. In such an embodiment, the output that is stored in the in-memory data structure may be used as an input associated with the second entity.

According to still another aspect of the present invention, a method for testing at least a first entity using a framework which includes a execution engine, a test interface, and an adapter that is in communication with the test interface includes obtaining a test application that is specified in declarative metadata and specifies at least the first entity being tested. The method also includes accessing the adapter through the test interface, the adapter being arranged to cooperate with the test interface to execute the test application, and running the test application using the test interface and the adapter. In one embodiment, the first entity is an API method invocation. In another embodiment, the test application is a SQL test application.

In accordance with yet another aspect of the present invention, a method for executing a test application includes executing a first API test that produces a first output, and storing the first output in an in-memory data structure. The first output may then be obtained from the in-memory data structure for use as an input to a subsequent API test that is executed. The first API test and the second API test, in one embodiment, are specified in declarative metadata. In such an embodiment, the declarative metadata may be XML metadata.

Other features and advantages of the invention will become readily apparent upon review of the following description in association with the accompanying drawings, where the same or similar structures are designated with the same reference numerals.

BRIEF DESCRIPTION OF THE DRAWINGS

The invention may best be understood by reference to the following description taken in conjunction with the accompanying drawings in which:

FIG. 1 is a block diagram representation of an architecture which includes a diagnostics and application programming interface (API) testing framework in accordance with an embodiment of the present invention.

FIG. 2 is a process flow diagram which illustrates the steps associated with one method of running an API test in accordance with an embodiment of the present invention.

FIG. 3 is a process flow diagram which illustrates the steps associated with one method of invoking an entity specified in declarative metadata, e.g., one embodiment of step 208 of FIG. 2, in accordance with an embodiment of the present invention.

FIG. 4 is a block diagram representation of a path followed by a declarative metadata structure, e.g., and XML schema definition of an API test, to a test interface in accordance with an embodiment of the present invention.

FIG. 5 is a block diagram representation of a schema definition written in declarative metadata, e.g., an XML schema definition, for an API test in accordance with an embodiment of the present invention.

FIG. 6 is a representation of an XML schema definition of an API test in accordance with an embodiment of the present invention.

FIG. 8 is a representation of one test application in accordance with an embodiment of the present invention.

FIG. 9a is a block diagram representation of how a result of a test may be pipelined in accordance with an embodiment of the present invention.

FIG. 9b is a block diagram representation of how an API test may utilize both pipeline and non-pipelined input and how an API test may generate both pipeline and non-pipelined output in accordance with an embodiment of the present invention.

DETAILED DESCRIPTION OF THE EMBODIMENTS

Figure 7:
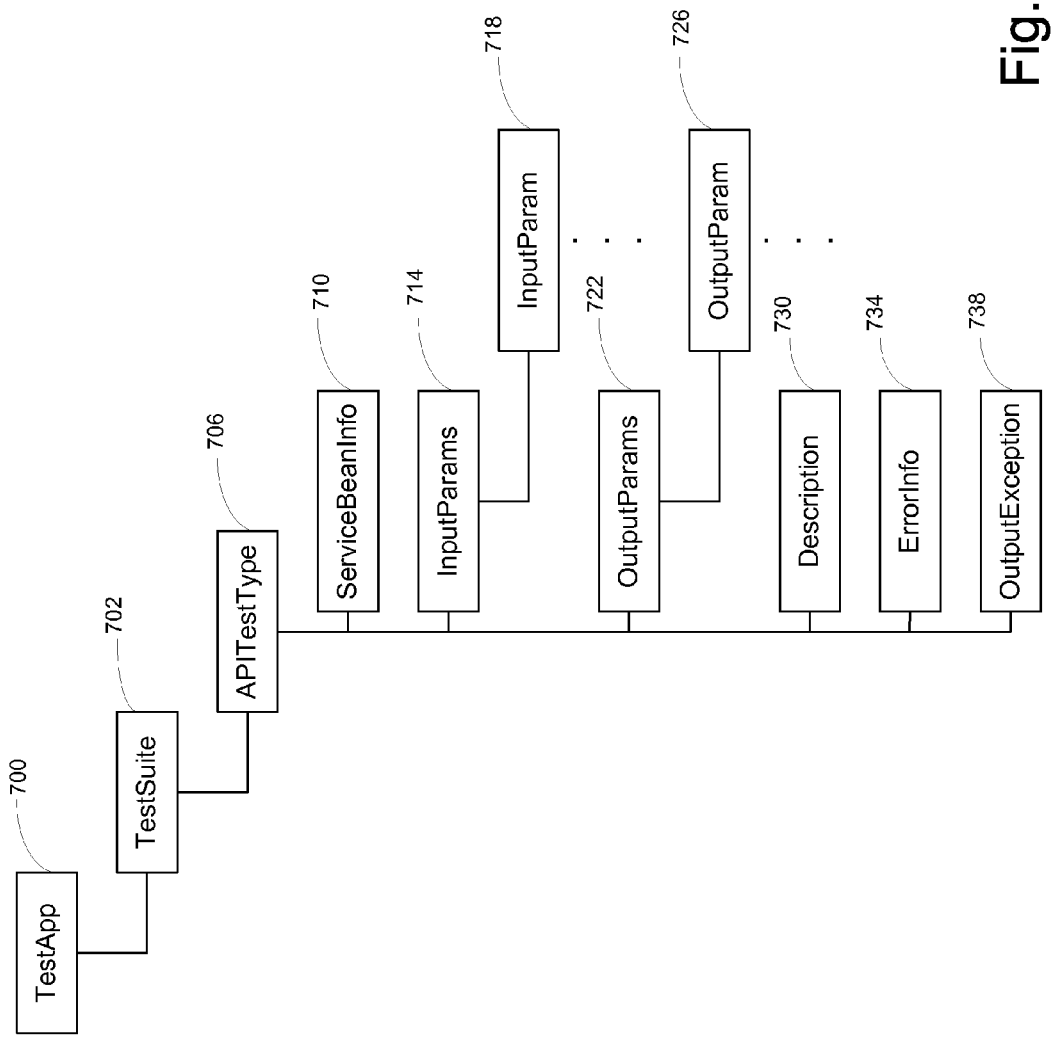
FIG. 7 is a diagrammatic representation of an XML tag structure which is used within an overall test application in accordance with an embodiment of the present invention.

In the description that follows, the present invention will be described in reference to embodiments that test subsystems on a platform for a software application, such as a database application. However, embodiments of the invention are not limited to any particular architecture, environment, application, or implementation. For example, although embodiments will be described in reference to database applications, the invention may be advantageously applied to any software application. Therefore, the description of the embodiments that follows is for purposes of illustration and not limitation.

A framework which enables application programming interface (API) testing to occur without requiring that a specific API test be written for each test case enables testing of API application code to occur efficiently. Such a framework may allow for relatively efficient development of API tests by effectively allowing functionality associated with different API tests to be shared and reused. Such a framework allows an API to be tested without requiring that significant amount of software be written, and further enables multiple API tests to be chained together, an API may be comprehensively tested in an efficient manner. Hence, the reliability of an API may be enhanced as developers may be more willing, as well as able, to more fully test an API since the need to write a significant amount of software code is effectively eliminated.

FIG. 1 is a diagrammatic representation of an implementation architecture of a diagnostics and API testing framework in accordance with an embodiment of the present invention. An architecture 100, which may be part of a computing system which includes processors and storage devices on which code devices associated with the architecture are stored, is arranged to provide a diagnostics and testing framework, e.g., an API testing framework. Within architecture 100, repositories 138, 148 are arranged to store data, e.g., repository 148 is arranged to store information pertaining to an API test. Repository 138, which may be a database that stores tables, is arranged to be accessed by a database metadata provider. Similarly, repository 148, which is arranged to store XML files is arranged to be accessed by an XML metadata provider 140 through an API test XML adapter 144a. It should be appreciated that although XML files are discussed, the files stored for use in the implementation architecture may generally be substantially any files written using declarative metadata.

Database metadata provider 136 and XML metadata provider 140 are source specific providers that are arranged to transform data into a format that may be understood by a execution engine or layer 112. While only database metadata provider 136 and XML metadata provider 140 are shown, any number of providers may generally be included that interface with execution engine 112 via a metadata provider interface 124. Metadata provider interface 124 is generally arranged such that providers such as database metadata provider 136 and XML metadata provider 140 may communicate with execution engine 112.

API test XML adapter 144a is arranged to enable custom tags of an XML schema definition, which will be described below with reference to FIGS. 5 and 6, to be read and written. In general, API test XML adapter 144a is an interface that is arranged to persist XML data. API test XML adapter 144a may marshal XML test data into a custom test object, e.g., a custom Java® (Java is a registered trademark of Sun Microsystems, Inc. of Santa Clara, California) test object, at runtime that may effectively be executed by execution engine 112. It should be understood that other types of text XML adapters, as for example a SQL test XML adapter 144b, may be provided to interface with XML metadata provider 140 to enable custom tags of an XML schema definition associated with a SQL test to be read and written. XML metadata provider 140 is generally arranged to identify an appropriate test XML adapter or test type adapter for a test to be executed.

When execution engine 112 runs tests such as an API test, execution engine 112 accesses a security provider interface 116 which provides a security model that is used to enforce authorization rules which control access to a test and to test results. That is, security provider interface 116 is arranged to enforce security in terms of who may run a test and who may view the output of a test. In one embodiment, security provider interface 116 delegates a call to a security provider (not shown).

Execution engine 112 also logs information, e.g., the output of tests, for reporting purposes using a log provider interface 120. Log provider interface 120 is effectively a reporting storage interface. Repositories such as an XML writer 128 and a database writer 132 which are interfaced with execution engine 112 through log provider interface 120 are arranged to store reports which are persisted in log files. XML writer 128 may be used for the storage of reports associated with XML metadata, while database writer 132 may be used for the storage of reports associated with database metadata.

In general, execution engine 112 includes the core execution logic associated with architecture 100, and delegates calls or logic to appropriate sources. Execution engine 112 may take user commands and cause a test to be run and registered, and also cause test results or output to be displayed as appropriate. For example, when an API test is to be run, execution engine 112 calls into a test interface 152 which effectively provides handshaking between execution engine 112 and adapters such as API test adapter 168, SQL test adapter 172, and any custom adapters 176.

For each test type, an adapter which is arranged to run the test type is effectively interfaced with test interface 152. By way of example, API test adapter 168 is arranged to include the logic that is needed in order to understand a test definition provided in an XML file. API test adapter 168 is arranged to instantiate the method identified in the XML file, and to provide the results of the instantiation to execution engine 112. In general, adapters such as API test adapter 168 transform declarative metadata into objects that implement test interface 152. At runtime, when execution engine 112 runs a test, an object that implements test interface 152 invokes desired APIs on a desired entity with prescribed input parameters, and also captures output parameters and performs comparisons to determine the success or the failure of the test.

In general, an adapter such as API test adapter 168 is a program which has the ability to transform data, e.g., declarative metadata, from one format into another such that the data may be understood by execution engine 112. API test adapter 168, for example, transforms test metadata into a format that is understood by execution engine 112.

Java diagnostic tests 156 which contain runtime information, a PL/SQL adapter 160, a declarative adapter 164, API test adapter 168, SQL test adapter 172, and any custom adapters 176 are all arranged to interface with execution engine 112 via test interface 152. Such elements effectively rewrite data into a language or format that is understood by test interface 152. Each of the elements which are effectively plugged into test interface 152 include a generic adapter portion or a common layer 154. Specifically, each element plugged into test interface 152 essentially extends the functionality or logic associated with generic adapter portion 154. In one embodiment, while generic adapter portion 154 effectively handles common tags associated with a declarative metadata file, the extensions associated with each element, e.g., the extensions off of generic adapter portion 154 associated with API test adapter 168, handle custom or unique tags within the declarative metadata file. It should be appreciated that API test adapter 168 may include the capabilities associated with API test XML adapter 144a. That is, API test adapter 168 may be arranged to persist XML data and to read and write custom tags, in addition to being arranged to provide a running test logic interface.

Extensibility enables custom adapters 176 to be written as needed, and then plugged into architecture 100 when additional functionality within architecture 100 is desired. Extensibility further enables such custom adapters 176 to utilize and build off of generic adapter portion 154.

A rendering interface 108, e.g., a user interface rendering interface, is in communication with execution engine 112, and enables information pertaining to tests to be displayed to a user. User interface rendering interface 108 may be JSP fronted for web-based user interfaces, for example, and generally provides an abstraction away from what a user interface is expected to look like. It should be appreciated that JSP is just one example of a suitable user interface technology. There may be several different user interfaces that may be used to present diagnostics data to a user. In general, user interfaces and commandline user interfaces may be in communication with user interface rendering interface 108 through renderers 104. For each available user interface, an associated user interface renderer 104 that implements method or routines prescribed by user interface rendering interface 108 typically exists. That is, diagnostic user interface renderers 104 implement user interface rendering interface 108. Such user interface renderers 104 may include, but are not limited to, a diagnostics renderer 104a, a Jdeveloper renderer 104b, a command line or text renderer 104c, and an integration renderer 104d, which may effectively be used to record a test when an application such as Winrunner is interfaced with integration renderer 104d. Winrunner 104d is available commercially from Mercury Interactive of Mountain View, Calif. In order for communication to be achieved with a user interface layer (not shown), execution engine 112 invokes the methods of a suitable user interface renderer 104 that is associated with a specified user interface.

With reference to FIG. 2, the steps associated with running an API test will be described in accordance with an embodiment of the present invention. A process 200 of running an API test begins at step 204 in which a declarative metadata schema definition is generated. The declarative metadata schema definition is generated to design an API test application that an API test tool may use to determine what to test. One configuration of an API test application will be described below with respect to FIG. 7. In the described embodiment, the declarative metadata used is XML, although it should be appreciated that substantially any type of declarative metadata may be used to generate a schema definition.

Once the declarative metadata schema definition is generated, an entity, e.g., a method, that is specified in the declarative metadata is invoked using an execution engine associated with the API test tool in step 208. One method of invoking an entity is described below with reference to FIG. 3. After the entity is invoked, the process of running an API test is completed.

Referring next to FIG. 3, the steps associated with one method of invoking an entity specified in declarative metadata will be described in accordance with an embodiment of the present invention. That is, one embodiment of step 208 of FIG. 2 will be described. A process of invoking an entity beings at step 304 in which an execution engine accesses a metadata provider interface to obtain metadata from an appropriate provider or repository. As previously discussed, the metadata provider interface generally allows access to both a database metadata provider and an XML metadata provider. Hence, in step 308, it is determined whether XML metadata is to be obtained from the XML metadata provider. When it is determined that XML metadata is not to be obtained from the XML metadata provider, then the indication is that metadata is to be obtained from another source, e.g., a database metadata provider. Accordingly, process flow proceeds to step 316 in which metadata is obtained from a source other than an XML metadata provider.

Alternatively, if it is determined in step 308 that XML metadata is to be obtained from the XML metadata provider, then in step 312, and API test type adapter, i.e., an API test XML adapter, is accessed by the execution engine through the metadata provider interface. Metadata, which in this case is XML metadata, is then obtained in step 316. Once metadata is obtained in step 316, the execution engine uses a test interface to call into an appropriate adapter class in step 320. In one embodiment, the appropriate adapter class may be an API test adapter class.

After the appropriate adapter class is called in step 320, the adapter class is invoked by the test interface in step 324. Then, the API test is run using the adapter class in step 328. Once the test is completed, the execution engine may access a log provider interface in order to log results of the test in step 332. Upon logging the results of the test, the process of invoking an entity specified in declarative metadata is completed.

FIG. 4 is a block diagram representation of a path followed by a declarative metadata structure, e.g., and XML schema definition of an API test, to a test interface in accordance with an embodiment of the present invention. A declarative metadata structure 402 is generally provided by a user and may be stored in a repository. Using an appropriate test adapter, as for example API test adapter 168 of FIG. 1, declarative metadata structure 402 is transformed into a programmatic representation 406. As discussed above, a test adapter is arranged to transform data, e.g., a declarative metadata structure 402, into a form that is understood by a test interface. Once the data is transformed into programmatic representation 406, programmatic representation 406 is passed to a test interface 410 which cooperates with the appropriate test adapter to instantiate a method defined in declarative metadata structure 402. Programmatic representation 406 is generally a diagnostic test object that is arranged to implement test interface 410 which is effectively understood by an execution engine.

In general, each test that is specified in declarative metadata, e.g., XML, is specified with a set of information in the form of tags. With reference to FIG. 5, the components of an XML schema definition for an API test will be described in accordance with an embodiment of the present invention. An XML schema definition specifies how data should be defined for an API test. A test 500 is typically specified with an entity to test 504, e.g., an API that is to be tested or an API test type. Entity to test 504 will generally include an attribute which an XML engine may use to determine what sort of entity is to be tested. In one embodiment, entity to test 504 may be a Java API test that may be invoked using Java reflection to instantiate an object of the appropriate Java class.

Test 500 also specifies input parameters 508, if there are any, which are to be used in test 500, as well as any output parameters 512, if there are any, which are to be produced by test 500. Input parameters 508 may be persisted in a run time data store, or values associated with input parameters 508 may be retrieved from the run time data store.

An error condition 516, or an output exception, that is specified in test 500 is arranged to indicate an condition which may cause test 500 to return an error. In one embodiment, error condition 516 may effectively be an output parameter, i.e., output parameters 512 may not necessarily be specified if error condition 516 is specified. Error message and fix information 520 is specified to indicate what caused an error and what may be done to correct the error. Typically, the error message and fix information will be displayed on a user interface in the event that test 500 fails.

FIG. 6 is a representation of an XML schema definition of an API test in accordance with an embodiment of the present invention. An XML schema definition 600 includes an API test type tag 604 that specifies an API to test. While the API to test may be substantially any suitable API, the API is shown as being an account creation API. Input parameters tag 608 which is specified in XML schema definition 600 is arranged to include, but is not limited to including, a first name of a potential account holder 628a, a last name of the potential account holder 628b, and a date of birth of the potential account holder 628c. Output parameters tag 612 generally includes an account number for a newly created account. A new account number 632 may be stored such that XML schemas for other API tests may access new account number 632, i.e., new account number 632 may be pipelined. The pipelining of data will be discussed below with reference to FIGS. 9a and 9b. An error condition tag 616 is specified for a normal error, and includes error message and fix information 620. In the embodiment as shown, XML schema definition 600 also includes a description tag 636 which is used to indicate what the API specified in entity to test 604 is arranged to do.

Some API tests which are specified within XML schema definitions or, more generally, declarative metadata, such as XML schema definition 600 of FIG. 6 may be a part of a test suite. A test suite is generally an overall test application which includes a plurality of API tests. Referring next to FIG. 7, an XML tag structure which is used within an overall test application will be described in accordance with an embodiment of the present invention. An XML tag structure for a test application 700 includes a test suite tag 702 which may identify a name of the test suite, and provide some information pertaining to the test suite. Test suite 702 generally contains a plurality of tests that test a particular piece of functionality. Since a test suite typically includes a group of tests, e.g., a logical group of tests, test type tags such as test type tag 706 are effectively a component of test suite 702. As shown, test type tag 706 may be an API test type tag.

In one embodiment, a test application represents an overall product that is being tested, and may include one or more test suites. Substantially all test suites or, more generally, tests specified in a test application are pertinent to the overall product that is being tested. While any number of attribute may be specified with a test application, a test application is typically specified with at least a short name for the test application, a full name for the test application, and a file version of the test application.

A service bean information tag 710, which may be specified under test type tag 706, is arranged to contain information relating to a service name and configuration information. Also specified under test type tag 706 are an input parameters tag 714, an output parameters tag 722, a description tag 730, an error information tag 734, and an output exception tag 738. Input parameters tag 714 is arranged to encapsulate any number of input parameter tags 718. Similarly, output parameters tag 722 is arranged to encapsulate any number of output parameter tags 726.

FIG. 8 is a representation of one test application in accordance with an embodiment of the present invention. A test application 800 may be specified with a name and an identifier that uniquely identifies test application 800. A test suite 802, which may be considered to be a first level of hierarchy within test application 800, includes a component identifier which indicates a group of tests being run within test application 800. Included in test suite 802 are any number of test types 806a-d which, in the embodiment as shown, are API tests types which are specified with a language, an identifier, a method name, and a class.

Each test type 806a-d, e.g., test type 806c, is specified with additional information, as discussed above with respect to FIGS. 5 and 6. The additional information typically includes input parameters 814, where each input parameter 818 is specified within input parameters 814. Similarly, the additional information specified in test types such as test type 806c also includes output parameters 822, where each output parameter 826 is specified within output parameters 822. Error information 834 is also typically specified within test types with a type. An error message and error fix information are also included within error information 834. In the described embodiment, test type 806c further includes a description 830 which describes test type 806c.

It should be appreciated that often data used by or created by a test such as an API test may be shared with other test applications or API tests. That is, data may be pipelined by storing data in variables that are accessible to multiple API tests. For example, an API test that creates a new account number may store the new account number in a variable that is accessed by an API test that obtains account balances in order to obtain a balance for the new account number. Hence, the new account number is pipelined in that it may be created by one API test and utilized by a second API test.

Pipelining generally involves using output values of one test as an input parameter for a subsequent test. FIG. 9a is a block diagram representation of how a result of a test may be pipelined in accordance with an embodiment of the present invention. A first API test 902 produces a result 914 that is stored in an in-memory data structure 910. In one embodiment, in-memory data structure 910 may be a runtime data store in a Java virtual machine. Result 914 is pipelined in that a second API test 906 retrieves result 914 from in-memory data structure 910, and uses result 914, i.e., as an input parameter. It should be appreciated that first API test 902 and second API test 906 are generally in a single test suite, and that once all tests in the test suite are executed, in-memory data structure 910 is effectively emptied.

In general, an API test that uses pipelined data as an input parameter may also create pipelined data as an output parameter. Additionally, an API test that produces pipeline data may also produce an output parameter that is not pipelined, and an API test that uses pipeline data as an input parameter may also use an input parameter that is not pipelined. With reference to FIG. 9b, an API test which utilizes both pipelined and non-pipelined input parameters as well as an API test which generates both pipelined and non-pipelined output parameters will be described in accordance with an embodiment of the present invention. A first API test 922 uses an input parameter 942 during execution, and produces a first output value 924 that is stored in an in-memory data structure 930. Input parameter 942 is typically a parameter that is specified in the declarative metadata associated with first API test 922. It should be appreciated that although first API test 922 may be arranged to provide substantially only first output value 924, first API test 922 may, in some embodiments, also provide a second output value 946, as shown. In an embodiment in which second output value 946 is produced and not stored in in-memory data structure 930, second output value 946 may be substantially discarded after being used in an associated comparison and displayed on a user interface as appropriate.

A second API test 926 retrieves value 924 from in-memory data structure 930 and uses value 924 as a first input parameter. Second API test 926 also uses a second input parameter 950 that is generally provided in the declarative metadata associated with second API test 926. Using value 924 and parameter 950 as inputs, second API test 926 produces a third output value 954 which is stored in in-memory data structure 930. Since third output value 954 is stored in in-memory data structure 930, third output value 954 is effectively pipelined as third output value 954 may be accessed by and used as an input to another API test (not shown).

As a part of an API test tool, the ability to mask out values which are essentially irrelevant to an API test enables many API test failures to be prevented. For instance, values which change and are not particularly relevant to an API test may cause failures when compared to "expected" values. By way of example, certain attributes such as an account number may not be relevant in a particular API test. In order to reduce the likelihood of failures caused when essentially irrelevant value is compared to an "expected" value, such values may be masked out using a field mask.

Figure 10:
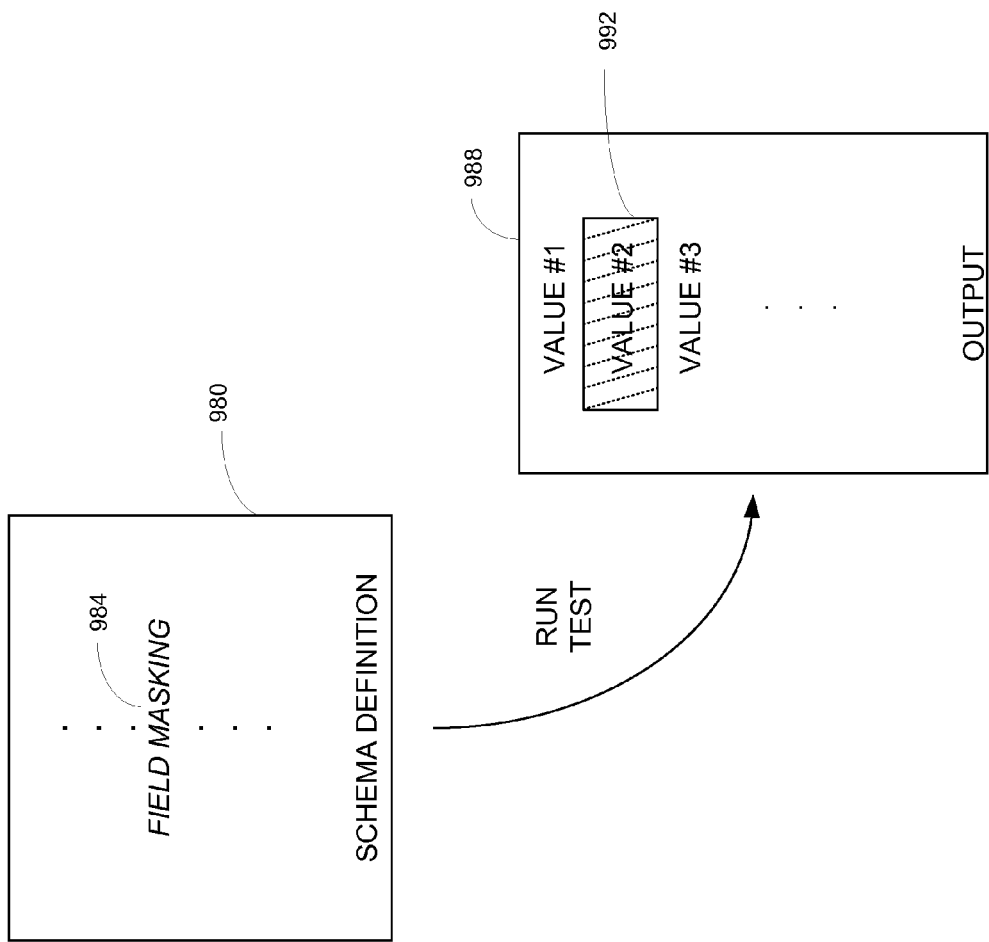
FIG. 10 is a block diagram representation of a process of field masking in accordance with an embodiment of the present invention.

With reference to FIG. 10, the field masking of values which are not relevant to a test being run will be described in accordance with an embodiment of the present invention. A schema definition 980 may specify a field masking attribute 984 which indicates that at least one output value of a test run using schema definition 980 is to be masked. As shown, output 988 from a test run using schema definition 980 includes a value 992 that is masked out such that value 992 may be ignored.

Although only a few embodiments of the present invention have been described, it should be understood that the present invention may be embodied in many other specific forms without departing from the spirit or the scope of the present invention. By way of example, while Java has generally been described as an API test type language, substantially any test type language may be used. Suitable test type languages may include, but are not limited to, PL/SQL.

While adapters which use a test interface have been described as utilizing or extending a generic adapter portion, some adapters may not necessarily make use of the generic adapter portion. For instance, a custom adapter that interfaces with the test interface may be created without utilizing any component of a generic adapter portion that may be used by other elements.

In one embodiment, pipelining is permitted across tests within one test suite, but is not permitted across different test suites. It should be appreciated, however, that in some instances, pipelining may not be limited to being used only with tests within one test suite. For example, in lieu of cleaning out a runtime data store after all tests within a test suite are executed, the data in the runtime data store may instead be persisted. Persisting the data in the runtime data store may enable other tests suites may utilize the data.

Generally, the steps associated with the methods of the present invention may vary widely. Steps may be added, removed, altered, and reordered without departing from the spirit or the scope of the present invention. Therefore, the present examples are to be considered as illustrative and not restrictive, and the invention is not to be limited to the details given herein, but may be modified within the scope of the appended claims.

What is claimed is:

1. A structure stored on a computer-readable medium, the structure, when executed by a processor, being arranged to define an application programming interface (API) test, the structure being a declarative metadata structure, the structure comprising:

an entity to be tested;

a first metadata arrangement, the first metadata arrangement being arranged to include any inputs associated with testing the entity;

a second metadata arrangement, the second metadata arrangement being arranged to include any expected outputs associated with testing the entity; and a specification of a pipelined datum, the pipelined datum being arranged to be accessed by the API test as well as a second API test, wherein the pipelined datum is one of an input to be read by the API test from an in-memory data structure and an output to be written by the API test into the in-memory data structure.

2. The structure of claim 1 comprising:
a third metadata arrangement, the third metadata arrangement being arranged to include any output exception codes.

3. The structure of claim 1 further including:
error information, the error information including error condition and error fix information.

4. The structure of claim 1 further including:
a specification of a masked field, the specification of the masked field being arranged to cause an output associated with testing the entity to be effectively masked.

5. The structure of claim 1 further including:
a description of the entity to be tested.

6. The structure of claim 1 wherein the entity to be tested is a method to be invoked.

7. The structure of claim 1 wherein the entity to be tested is a database to be tested using one of SQL and PL/SQL.

8. The structure of claim 1 wherein the declarative metadata structure is represented as XML.

9. The structure of claim 1 wherein the first metadata arrangement includes a first metadata tag and a first attribute and the second metadata arrangement includes a second metadata tag and a second attribute.

10. The structure of claim 1 further including:
a specification of a first pipelined datum, wherein the first pipelined datum is written by the API test and subsequently used as input by a second API test.

11. The structure of claim 10 wherein the first pipelined datum is stored in an in-memory data structure.

12. The structure of claim 10 wherein output of the second API test is written as a second pipelined datum and subsequently used as input by a third API test.

13. The structure of claim 1 further including:
a specification of a pipelined datum, wherein a first portion of output from the API test is written as the pipelined datum in an in-line memory data structure, a second portion of output from the API test is not written as the pipelined datum and not stored in the in-line memory data structure, and the pipelined datum from the in-line memory data structure is used as input by a second API test.

14. The structure of claim 13 wherein output from the second API test is stored in the in-line memory data structure.

15. A structure stored on a computer-readable medium, the structure, when executed by a processor, being arranged to define an application programming interface (API) test suite, the structure being a declarative metadata structure, the structure comprising:
a first entity to be tested, the first entity having an associated first metadata arrangement including any inputs associated with testing the first entity and an associated second metadata arrangement including any expected outputs associated with testing the first entity;
a second entity to be tested, the second entity having an associated third metadata arrangement including any inputs associated with testing the second entity and an associated fourth metadata arrangement including any expected outputs associated with testing the second entity, wherein the first entity to be tested is a first method associated with an API and the second entity to be tested is a second method associated with the API, at least one output associated with the first entity is stored in an in-memory data structure, and the at least one output associated with the first entity that is stored in the in-memory data structure is used as an input associated with the second entity.

16. The structure of claim 15 wherein the expected outputs associated with testing the first entity and expected outputs associated with testing the second entity include expected exceptions.

17. The structure of claim 15 wherein the first entity to be tested and the second entity to be tested each have associated error information, the error information including at least one of an error condition, an error message, and error fix information.

18. The structure of claim 15 wherein at least one output associated with the first entity is arranged to be masked.

19. The structure of claim 15 wherein the declarative metadata structure is an XML schema definition.

20. structure of claim 15 further including:
a specification of a first pipelined datum, wherein the first pipelined datum is written by a first test of the first entity and subsequently used as input by a second test of the first entity.

21. The structure of claim 15 further including:
a specification of a pipelined datum, wherein a first portion of output from a first test of the first entity is written as the pipelined datum in an in-line memory data structure, a second portion of output from the first test is not written as the pipelined datum and not stored in the in-line memory data structure, and the pipelined datum from the in-line memory data structure is used as input by a second test of the first entity.

22. The structure of claim 15 further including:
a specification of a pipelined datum, wherein a first portion of output from a first test of the first entity is written as the pipelined datum in an in-line memory data structure, a second portion of output from the first test is not written as the pipelined datum and not stored in the in-line memory data structure, and the pipelined datum from the in-line memory data structure is used as input by a second test of the second entity.

23. A computer-implemented method for testing at least a first entity using a framework which includes an execution engine, a test interface, and an adapter that is in communication with the test interface, the method comprising:
obtaining a test application, the test application being specified in declarative metadata, the test application being arranged to specify at least the first entity being tested;
accessing the adapter through the test interface, the adapter being arranged to cooperate with the test interface to execute the test application; and
running the test application using the test interface and the adapter, wherein the test application is further arranged to specify at least a second entity to be tested and running the test application causes a first output associated with testing the first entity to be stored in an in-memory data structure and causes the first output associated with testing the first entity to be obtained from the in-memory data structure as a first input associated with testing the second entity.

24. The method of claim 23 wherein the test application is further arranged to specify any inputs associated with testing the first entity, any expected outputs associated with testing the first entity, and error information associated with testing the first entity.

25. The method of claim 24 wherein at least one of the expected outputs is arranged to be masked.

26. The method of claim 24 wherein at least one of the expected outputs is arranged to be stored into an in-memory data structure.

27. The method of claim 24 wherein at least one of the inputs is arranged to be read from an in-memory data structure.

28. The method of claim 23 wherein the first entity is a method invocation.

29. The method of claim 23 wherein the test application is one of an application programming interface (API) test application and a SQL test application.

30. The method of claim 23 wherein obtaining the test application includes obtaining the test application from a declarative metadata provider that is in communication with the execution engine.

31. The method of claim 30 wherein the declarative metadata provider is in communication with a test declarative metadata adapter that is arranged to obtain the test application from a repository.

32. The method of claim 23 wherein the declarative metadata is XML metadata.

33. A framework, stored on a computer-readable medium, executed by a processor, for testing at least a first entity, the framework comprising:
   an execution engine;
   a test interface arranged to be accessed by the execution engine;
   an adapter, the adapter being in communication with the test interface;
   code devices that cause a test application to be obtained, the test application being specified in declarative metadata, the test application being arranged to specify at least the first entity being tested;
   code devices that cause the adapter to be accessed through the test interface, the adapter being arranged to cooperate with the test interface to execute the test application; and
   code devices that cause the test application to be run using the test interface and the adapter, wherein the test application is further arranged to specify at least a second entity to be tested and the code device that cause the test application to be run include code devices that cause a first output associated with testing the first entity to be stored in an in-memory data structure and code devices that cause the first output associated with testing the first entity to be obtained from the in-memory data structure as a first input associated with testing the second entity.

34. The framework of claim 33 wherein the test application is further arranged to specify any inputs associated with testing the first entity, any expected outputs associated with testing the first entity, and error information associated with testing the first entity.

35. The framework of claim 33 wherein the first entity is a method invocation.

36. The framework of claim 33 wherein the declarative metadata is XML metadata.

37. A framework, stored on a computer-readable medium, executed by a processor, for testing at least a first entity, the framework comprising:
   means for obtaining a test application, the test application being specified in declarative metadata, the test application being arranged to specify at least the first entity being tested;
   means for accessing the adapter through the test interface, the adapter being arranged to cooperate with the test interface to execute the test application;
   means for running the test application using the test interface and the adapter; and
   means for specifying at least a second entity to be tested, wherein the means for running the test application include means for causing a first output associated with testing the first entity to be stored in an in-memory data structure and means for causing the first output associated with testing the first entity to be obtained from the in-memory data structure as a first input associated with testing the second entity.

38. The framework of claim 37 wherein the test application is farther arranged to include means for specifying any inputs associated with testing the first entity, any expected outputs associated with testing the first entity, and error information associated with testing the first entity.

39. The framework of claim 38 further including means for masking at least one of the expected outputs is arranged to be masked.

40. The framework of claim 38 further including means for storing at least one of the expected outputs in an in-memory data structure.

41. The framework of claim 37 wherein the test application is one of an application programming interface (API) test application and a SQL test application.

42. The framework of claim 37 wherein the declarative metadata is XML metadata.

43. A computer-implemented method for executing a test application in a framework comprising a test interface and an adapter that is in communication with the test interface, the method comprising:
   executing a first application programming interface (API) test using the test interface, wherein executing the first API test produces a first output;
   storing the first output in an in-memory data structure;
   obtaining the first output from the in-memory data structure; and
   executing a second API test, wherein executing the second API test uses the first output obtained from the in-memory data structure as an input to the second API test, wherein the first API test and the second API test are specified in declarative metadata.

44. The method of claim 43 wherein the declarative metadata is XML metadata.

45. The method of claim 43 wherein executing the second API test produces a second output, and the method further includes:
   storing the second output in the in-memory data structure.

* * * * *

UNITED STATES PATENT AND TRADEMARK OFFICE
CERTIFICATE OF CORRECTION

| | |
|---|---|
| PATENT NO. | : 7,506,311 B2 |
| APPLICATION NO. | : 10/991883 |
| DATED | : March 17, 2009 |
| INVENTOR(S) | : Subramanian et al. |

It is certified that error appears in the above-identified patent and that said Letters Patent is hereby corrected as shown below:

In column 12, line 17, in claim 20, before "structure" insert -- The --.

In column 14, line 22, in claim 38, delete "farther" and insert -- further --, therefor.

Signed and Sealed this

Eighteenth Day of May, 2010

David J. Kappos
*Director of the United States Patent and Trademark Office*